(12) United States Patent
Tan et al.

(10) Patent No.: US 8,138,257 B1
(45) Date of Patent: Mar. 20, 2012

(54) BIS(TRIALKYLSILOXYPHENYL)-ARYLFLUORIDE IMIDE $AB_2$ MONOMERS, HYPERBRANCHED POLYMERS AND NANOCLAY COMPOSITES THEREFROM

(75) Inventors: Loon-Seng Tan, Centerville, OH (US); David H. Wang, Beavercreek, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 149 days.

(21) Appl. No.: 12/708,556

(22) Filed: Feb. 19, 2010

Related U.S. Application Data

(60) Provisional application No. 61/157,922, filed on Mar. 6, 2009.

(51) Int. Cl.
*C08K 3/08* (2006.01)

(52) U.S. Cl. .......... 524/445; 524/447; 528/86; 528/219; 528/401; 977/778; 977/781

(58) Field of Classification Search .................. None
See application file for complete search history.

(56) References Cited

U.S. PATENT DOCUMENTS
6,512,124 B1 *  1/2003  Baek et al. .................... 548/476

OTHER PUBLICATIONS
ACS Symposium Series entitled "In Step-Growth Polymers for High Performance Materials" by Hedrick et al. published by the American Chemical Society: Washington DC 1996.*
Product Bulletin for Closite 10A.*

* cited by examiner

*Primary Examiner* — Marc Zimmer
(74) *Attorney, Agent, or Firm* — AFMCLO/JAZ; Bart Hersko

(57) ABSTRACT

Novel aromatic $AB_2$ imide monomer with thermally reactive trialkylsiloxy and aryl fluoride moieties, which can be polymerized to form hyperbranched aromatic polyimides in the presence of a metal fluoride catalyst. Nanoclay composites were generated by either (i) direct blending of a preformed hyperbranched aromatic polyimide and Closite nanoclay ($\leq 20$ wt %) or (ii) blending of the $AB_2$ monomer, CsF catalyst and Closite nanoclay ($\leq 20$ wt %) followed by thermal solid-state polymerization of the $AB_2$ monomer homogeneously dispersed in the nanoclay.

6 Claims, No Drawings

BIS(TRIALKYLSILOXYPHENYL)-ARYLFLUORIDE IMIDE AB$_2$ MONOMERS, HYPERBRANCHED POLYMERS AND NANOCLAY COMPOSITES THEREFROM

CROSS REFERENCE TO RELATED APPLICATION

This application claims priority of the filing date of provisional application Ser. No. 61/157,922 filed Mar. 6, 2009.

RIGHTS OF THE GOVERNMENT

The invention described herein may be manufactured and used by or for the Government of the United States for all governmental purposes without the payment of any royalty.

BACKGROUND OF THE INVENTION

The present invention relates to novel aromatic AB$_2$ imide monomers with thermally reactive trialkylsiloxy and aryl fluoride moieties, which can be polymerized to form hyperbranched aromatic polyimides in the presence of a metal fluoride catalyst.

Aromatic polyimides (PIs) are well known, high-performance materials with widespread applications in the aerospace and electronics industries due to their excellent thermomechanical and dielectric properties. Recently, it was demonstrated that they could be useful as optical materials based on their optical anisotropy when cast in directions parallel (in-plane) and perpendicular (out-of-plane) to the film surface. However, when fully imidized, most aromatic PI's have limited solubility in common organic solvents because of their structural rigidity and high degree of crystallinity; thus restricting the choice in processing options. Numerous research efforts have focused on organo-soluble PIs from the modification of the structure without substantially decreasing rigidity of their backbone. Solubility is desired in order to allow processing polymers with preformed imide units and to avoid the problems associated with handling poly(amic acid) (PAA) precursors. In addition, homogeneous, post-polymer reactions of soluble aromatic polyimides would allow better control in the introduction of desirable functional groups.

A viable alternative to attaining solubility in aromatic PIs is to change the traditional, linear geometry of the macromolecules to three-dimensional, highly branched (dendritic) architecture. As a subset of dendritic polymers, hyperbranched polymers have several important advantages such as better solubility compared to their linear counterparts, and easier synthesis than their analogous dendrimers, which involve tedious multi-step synthesis. Large quantity of hyperbranched polymers can be easily produced from AB$_x$ (x≧2) monomers. There are few reports on synthesis of hyperbranched PIs, and their utilization.

Accordingly, it is an object of the present invention to provided a self-polymerizable AB$_2$ monomer of the generic formula

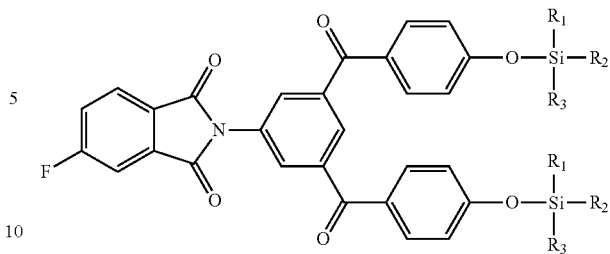

where R$_1$, R$_2$ and R$_3$ which may or may not be the same; preferably, R$_1$=R$_2$=R$_3$=Methyl; R$_1$=R$_2$=methyl and R$_3$=ethyl, n-propyl, iso-propyl, n-butyl, iso-butyl, sec-butyl, t-butyl, neopentyl. The resulting AB$_2$ monomer can be polymerized with the aid of a fluoride salt, preferably cesium fluoride, in catalytic amount to afford high molecular, low viscosity hyperbranched ether-ketone-imide polymer having repeating units with trialkylsilyloxyphenyl endgroups:

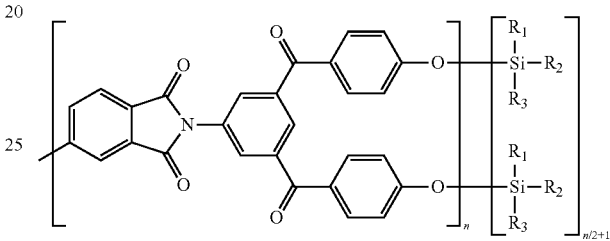

There has been a great interest in polymer-clay nanocomposites since nanoclays can improve the polymer mechanical and thermal properties at low loadings. Recently, dendrimers and hyperbranched polymers, with their globular conformations and a large number of polar end groups per molecule, have shown to promote exfoliation of nanoclay. For example, hyperbranched aliphatic polyesters such as commercially available Boltorn resins (Perstorp, Sweden) have been commonly used to intercalate and exfoliate Closite NA (Na$^+$ MMT) in water successfully. However, these aliphatic hyperbranched polymers are not suitable for high temperature conditions that are frequently necessary in aerospace applications.

Therefore, another objective of the present invention is to provide hyperbranched aromatic polyimide-clay nanocomposites.

Other objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

SUMMARY OF THE INVENTION

In accordance with the present invention, there is provided a thermally self-polymerizable AB$_2$ monomer of the generic formula,

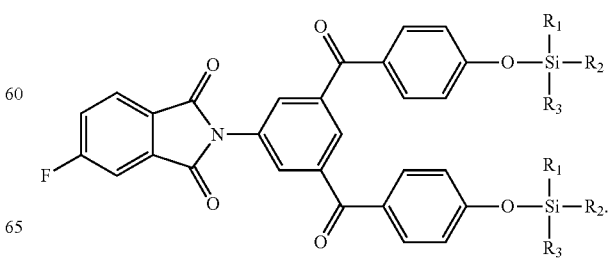

and the associated hyperbranched polymer of the generic formula,

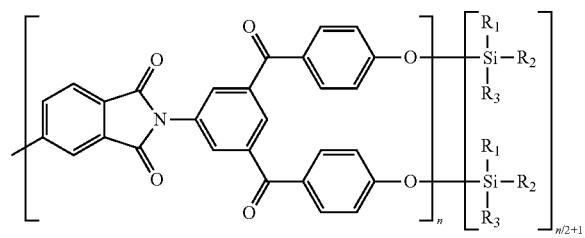

where $R_1$, $R_2$ and $R_3$ which may or may not be the same; preferably, $R_1=R_2=R_3=$Methyl; $R_1=R_2=$methyl and $R_3=$ethyl, n-propyl, iso-propyl, n-butyl, iso-butyl, sec-butyl, t-butyl, neopentyl. The total number of trialkylsilyl ($R_1R_2R_3$Si—) endgroups equals to degree of polymerization (n) plus 1.

DETAILED DESCRIPTION OF THE INVENTION

Synthesis of the $AB_2$ monomer of this invention, N-{3,5-bis(4-trialkylsilyloxybenzoyl)benzene}-4-fluoroisophthalimide (compound 6), is shown by the following reaction sequence:

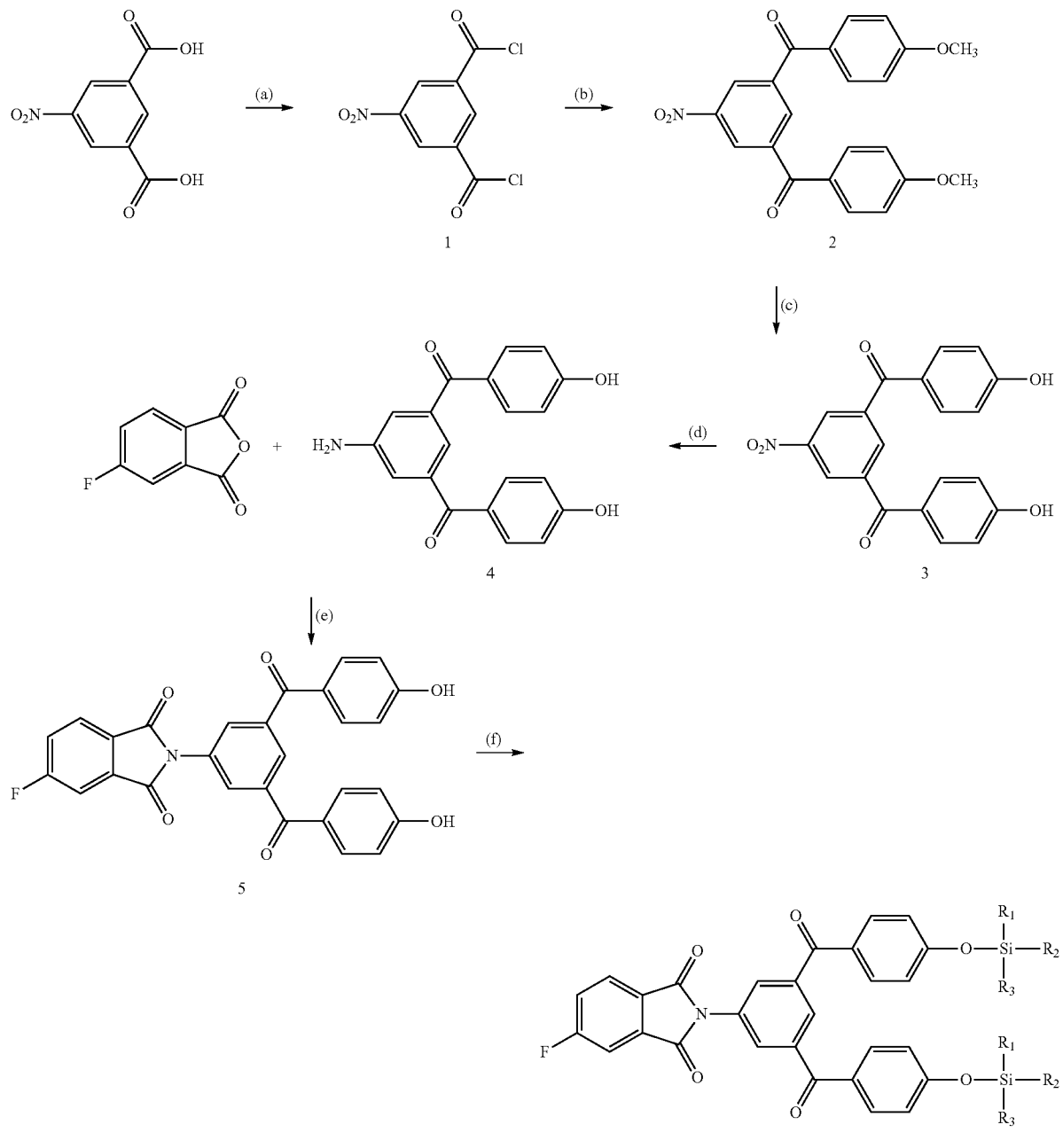

In this sequence, 5-nitroisophthalic acid is first treated with thionyl chloride (reaction a) to provide 5-nitroisophthaloyl dichloride (1). Friedel-Crafts reaction of 1 with anisole in the presence of aluminum chloride (reaction b) gives 3,5-bis(4-methoxybenzoyl)nitrobenzene (2), which is then demethylated with pyridine hydrochloride (reaction c) to provide 3,5-bis(4-hydroxybenzoyl)nitrobenzene (3). Compound 3 is then reduced (reaction d) to 3,5-bis(4-hydroxybenzoyl)aniline (4). Upon reacting with 4-fluoroisophthalic anhydride, with catalytic amount of isoquinoline, 4 is converted to, N-{3,5-bis(4-hydroxybenzoyl)benzene}-4-fluoroisophthalimide, compound 5 (reaction e). Finally, compound 5 was treated with 2 equivalents of a trialkylsilyl chloride, preferably, t-butyldimethylsilyl chloride to obtain the desired $AB_2$ monomer, 6 (reaction f).

The resulting $AB_2$ monomer can be thermally polymerized in with the aid of a catalytic amount of a metal fluoride, preferably, cesium fluoride to afford high molecular, low viscosity hyperbranched ether-ketone-imide polymer having repeating units with trialkylsilyl endgroups, whose number is 0.5n+1, where n=degree of polymerization, commonly known as number of repeat units:

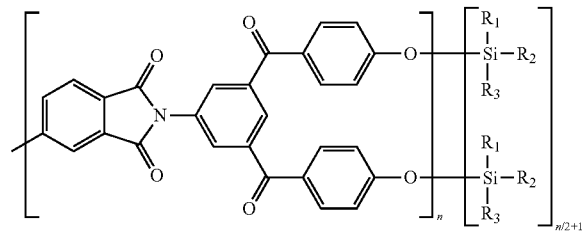

Polymerization could be either in solution or melt conditions.

In addition, the resulting $AB_2$ monomer can be directly blended or in-situ polymerized in the presence of nanoclay to provide nanocomposites with exfoliated and intercalated clay nanoplatelets. Suitable solvents for the direct blending and/or in situ blending processes include tetrahydrofuran or N,N-dimethylamide. A catalytic amount of a metal fluoride such as cesium fluoride is preferably added to the solvent in the in situ blending of the $AB_2$ monomer and nanoclay process.

The following examples illustrate the invention:

EXAMPLE 1

5-Nitroisophthaloyl dichloride (1)

Into a 500 mL one-necked round bottom flask equipped with a magnetic stirrer and nitrogen inlet, 5-nitroisophthalic acid (25.0 g, 0.12 mol) was dissolved freshly distilled thionyl chloride (80 mL) containing DMF (3 drops). The mixture was stirred at room temperature for 2 h and gently heated under reflux for 6 h. Excess amount of thionyl chloride was distilled off and the mixture was then chilled in an ice-and-salt bath. Freshly distilled hexane was added into the light yellow residue with vigorous stirring. The resulting white needles are collected by suction filtration and dried under reduced pressure to give 29.1 g (99.1% yield) of white needles, m.p. 59-61.5° C. FT-IR (KBr, cm$^{-1}$): 1536, 1349 (Ar—NO$_2$), 1757 (carbonyl). Mass spectrum (m/e): 248 (M$^+$, 100% relative abundance). $^1$H-NMR (CDCl$_3$, δ in ppm): 8.96 (s, 2H, Ar), 9.12 (s, 1H, Ar). $^{13}$C-NMR (CDCl$_3$, δ in ppm): 127.89, 133.33, 136.12, 148.25, 165.35.

EXAMPLE 2

3,5-Bis(4-methoxylbenzoyl)nitrobenzene (2)

Into a 250 mL three-necked, round-bottomed flask equipped with a magnetic stirrer, nitrogen inlet, and dropping funnel, aluminum chloride (25.4 g, 0.19 mol) and anhydrous anisole (60 mL) were introduced. After the mixture was cooled down to 15° C. in an ice-water bath, a solution of 5-nitroisophthaloyl dichloride (15.0 g, 60 mmol) in anhydrous anisole was then added dropwise for 20 min. The mixture was allowed to warm to room temperature. After 8 h of stirring, the mixture was poured into 5% hydrochloric acid. The organic layer was diluted with methylene chloride, separated with the aid of a separatory funnel, and rotovapped to dryness. The resulting off-white solid residue was dissolved in hot ethanol and allowed to cool to room temperature to give 11.2 g (47.7% yield) of off-white solids, m.p. 181-182° C. Anal. Calcd. for $C_{22}H_{17}NO_6$: C, 67.52%; H, 4.38%; N, 3.58%; O, 24.53%. Found: C, 67.56%; H, 4.35%; N, 3.45%; O, 24.76%. FT-IR (KBr, cm$^{-1}$): 1538 (Ar—NO$_2$), 1262, 1325 (ether), 1598, 1655 (carbonyl). Mass spectrum (m/e): 391 (M$^+$, 100% relative abundance). $^1$H-NMR (DMSO-d$_6$; δ in ppm) 3.89 (s, 6H, OCH$_3$), 7.12-7.15 (d, 2H, Ar), 7.85-7.88 (d, 2H, Ar), 8.26 (t, 1H, Ar), 8.61 (d, 2H, Ar). $^{13}$C-NMR (DMSO-d$_6$; δ in ppm) 55.61, 114.15, 126.27, 128.09, 132.47, 135.00, 139.18, 147.67, 163.57, 191.53.

EXAMPLE 3

3,5-Bis(4-hydroxybenzoyl)nitrobenzene (3)

Into a 250 mL three-necked, round-bottomed flask equipped with a magnetic stirrer, a condenser, and nitrogen inlet, 3,5-bis(4-methoxyphenylcarbonyl) nitrobenzene (6.2 g, 15.8 mmol) and freshly prepared pyridine hydrochloride (100 g) were placed. The mixture was heated under reflux until the solution became homogeneous. It took about 4 h. After cooled down 120° C., the mixture was poured into water. The resulting precipitate was collected and dried. The yellow solid was slurred in boiling toluene and collected by suction filtration to give 5.5 g (96% yield), m.p. 230-231.8° C. Anal. Calcd. for $C_{20}H_{13}NO_6$: C, 66.12%; H, 3.61%; N, 3.86%; O, 26.42%. Found: C, 66.07%; H, 3.64%; N, 3.67%; O, 17.01%. FT-IR (KBr, cm$^{-1}$): 1321, 1538 (A-NO$_2$), 1602, 1648 (carbonyl), 3420 (Ar—OH). Mass spectrum (m/e): 363 (M$^+$, 100% relative abundance). $^1$H-NMR (DMSO-d$_6$, δ in ppm): 6.93-6.96 (d, 4H, Ar), 7.76-7.79 (d, 4H, Ar), 8.23 (s, 1H, Ar), 8.58 (s, 2H, Ar), 10.66 (s, 2H, OH). $^{13}$C-NMR (DMSO-d$_6$, δ in ppm) 115.48, 126.02, 126.65, 132.84, 134.83, 139.44, 147.61, 156.80, 162.70, 191.36.

EXAMPLE 4

3,5-Bis(4-hydroxybenzoyl)aminobenzene (4)

Into a 500 mL high pressure bottle, 5-nitroisophthalic acid (4.8 g, 13 mmol), palladium on activated carbon (10%, 0.5 g), and ethanol (100 mL) were charged. The bottle was placed on the hydrogenation vessel. Hydrogen was charged and discharged five times and agitated at 60-65 psi for 24 h. After the reaction mixture had been filtered through a cake of Celite 545 to remove catalyst, the solvent of the filtrate was removed on a rotary evaporator. The light yellow solid was recrystallized from deoxygenated 20% ethanol to give 4.4 g (>99% yield) of yellow powder, m.p. 249.5-250.5° C. Anal. Calcd. for $C_{20}H_{16}NO_4$: C, 72.06%; H, 4.54%; N, 4.20%; O, 19.20%.

Found: C, 72.04%; H, 4.89%; N, 3.91%; O, 18.60%. FT-IR (KBr, cm$^{-1}$): 763 (Ar—NH$_2$), 1598 1634 (carbonyl), 3378 (Ar—NH$_2$). Mass spectrum (m/e): 333 (M$^+$, 100% relative abundance). $^1$H-NMR (DMSO-d$_6$; δ in ppm): 5.71 (s, 2H, NH$_2$), 6.90-6.93 (d, 4H, Ar), 6.70 (s, 1H, Ar), 7.14 (s, 2H, Ar), 7.70-7.71 (d, 4H, Ar), 10.44 (s, 1H, OH). $^{13}$C-NMR (DMSO-d$_6$; δ in ppm): 115.10, 117.09, 117.55, 127.95, 132.35, 138.57, 148.91, 161.87, 194.21.

EXAMPLE 5

N-{3,5-bis(4-hydroxybenzoylbenzene)}-4-fluorophthalimide (5)

Into a 250 mL three-necked round-bottomed flask equipped with a magnetic stirrer and nitrogen inlet and outlet, 3,5-bis(4-hydroxyphenylcarbonyl) aminobenzene (4.3 g, 13 mmol) was completely dissolved in NMP (50 mL). 4-Fluorophthalic anhydride (2.1 g, 12 mmol) was then added. The mixture was then heated and when temperature was approaching 170-180° C., isoquinoline (5 drops) was added. The mixture was heated at 200° C. with stirring for 18 h. After cooled down to room temperature, the mixture was poured into 5% hydrochloric acid and the resulting precipitate was collected by suction filtration and dried under the reduced pressure. The off-white solid was dissolved in hot toluene and allowed to cool to room temperature to give 4.3 g (72% yield) of off-white solid, m.p. 274-276° C. Anal. Calcd. for C$_{26}$H$_{16}$FNO$_6$: C, 69.86%; H, 3.35%; N, 2.91%. Found: C, 69.90%; H, 3.90%; N, 2.66%. FT-IR (KBr, cm$^{-1}$): 1644, 1601 (imide), 1724 (carbonyl) 3413 (Ar—OH). Mass spectrum (m/e): 481 (M$^+$, 100% relative abundance). $^1$H-NMR (DMSO-d$_6$, δ in ppm): 6.93-6.96 (d, 4H, Ar), 7.71-7.75 (d, 1H, Ar), 7.78-7.82 (d, 4H, Ar), 7.89-7.93 (dd, 1H, Ar), 7.96-7.97 (t, 1H, Ar), 8.05-8.07 (d, 1H, Ar), 8.09-8.10 (d, 2H, Ar), 10.58 (s, 2H, OH). $^{13}$C-NMR (DMSO-d$_6$, δ in ppm) 111.44, 115.36, 121.38, 126.30, 127.11, 127.71, 128.95, 130.45, 132.70, 134.65, 138.43, 162.36, 163.97, 165.47, 165.73, 167.71, 192.45.

EXAMPLE 6

N-[3,5-bis(4-t-butyldimethylsilyloxybenzoyl)benzene]-4-fluorophthalimide (6)

Into a 100 mL three-necked flask equipped with a magnetic stir bar and nitrogen inlet and outlet were placed N-{3,5-bis (4-hydroxybenzoylbenzene)}-4-fluorophthalimide (5)

(4.81 g, 10.0 mmol), imidazole (3.30 g, 22 mmol) and CH$_2$Cl$_2$ (100 mL). The mixture was stirred at room temperature for 24 h and filtered. The filtrate was rotary-evaporated to dryness, and the resulting solid was recrystallized from heptane to afford 5.60 g (79%) of white needle crystals, m.p. 196-197° C. MS (m/e): 709 (M$^+$). Anal. Calcd. for C$_{40}$H$_{44}$NFO$_6$Si$_2$: C, 67.67%; H, 6.25%; N, 1.97%; F, 2.68%. Found: C, 67.58%; H, 6.26%; N, 1.94%; F, 52.80%. (NMR, IR data)

EXAMPLE 7

Hyperbranched Polymer Derived from N,N'-Bis(3-acetylphenyl)-4,4'-(hexafluoroisopropylidene)diphthalimide (HT-PAEKI)

Into a 100 mL three-necked, round-bottomed flask equipped with a magnetic stirrer, nitrogen inlet and outlet, and Dean-Stark trap with a condenser, N-[3,5-bis(4-hydroxybenzoyl)benzene]-4-fluorophthalimide, example 5, (1.5 g, 3.1 mmol), potassium carbonate (1.0 g, 7.2 mmol), and a mixture of NMP (30 mL) and toluene solvent were placed. The reaction mixture was then heated and maintained at 140-150° C. for 4 h. During this time period, the water formed was removed by toluene azeotropic distillation via a Dean-Stark trap. After complete removal of toluene by an increased the flow of nitrogen, the orange solution was then heated at 160° C. for 3 h. The solution became brown in color and viscous. Some precipitate was observed 30 min after reaction temperature had reached 160° C. After being allowed to cool down on its own, the mixture was poured into a beaker containing 5% hydrochloric acid (300 mL). The resulting precipitate was collected by suction filtration and air-dried. Off-white powder was dissolved in NMP again and passed through a cake of Celite 545 to remove any insoluble salts. The filtrate was poured in a beaker containing 5% hydrochloric acid (300 mL) and warmed up to around 60-70° C. for 2 h. The white powder was collected and dried under the reduced pressure over phosphorus pentoxide at 100° C. for 48 h. The yield was essentially quantitative. [η]=0.13 dL/g. T$_g$=224° C. Anal. Calcd. for C$_{28}$H$_{15}$NO$_6$: C, 72.88%; H, 3.28%; N, 3.06%. Found: C, 68.55%; H, 3.93%; N, 3.01%. $^1$H-NMR (DMSO-d$_6$; δ in ppm) 6.89-8.39 (Ar—H) and 10.55-10.84 (Ar—OH). Thermogravemetric analysis result indicates that this hyperbranched polymer lost 5% of its original weight about 400° C. in air and 416° C. in helium, respectively.

EXAMPLE 8

Hyperbranched Polymer Prepared from Propargylation of Hyperbranched HT-PAEKI (PT-PAEKI)

Into a 50 mL three-necked, round-bottomed flask equipped with a magnetic stirrer, nitrogen inlet, and a condenser, hydroxyl-terminated hyperbranched poly(arylene-ether-ketone-imide, (HT-PAEKI, example 6; 0.5 g, 1.08 mmol), potassium carbonate (0.4 g, 2.9 mmol), propargyl bromide (0.30 g, 2.52 mmol), and NMP (10 mL) were placed. The reaction mixture was then heated and maintained at 80-90° C. for 10 h. During this time period, the orange solution became light yellow in color and homogeneous. After it had been allowed to cool down on its own, the mixture was filtered through a cake of Celite 545 to remove any insoluble salts. The filtrate was then poured into a beaker containing 5% hydrochloric acid (300 mL) and the mixture was warmed up to around 60-70° C. for 2 h. The white powder was collected and dried under the reduced pressure in the presence of phosphorus pentoxide at 50° C. for 48 h. The yield was essentially quantitative. [η]=0.08 dL/g. T$_g$=122. Anal. Calcd. for C$_{31}$H$_{17}$NO$_6$: C, 74.55%; H, 3.43%; N, 2.80%; O, 19.22%. Found: C, 73.07%; H, 3.82%; N, 2.70%; O, 17.99%. $^1$H-NMR (DMSO-d$_6$, δ in ppm): 3.64 (—CH$_2$—C≡CH), 4.96 (—CH$_2$—C≡CH), and 7.11-8.21 (Ar—H).

EXAMPLE 9 t-Butyldimethylsilyl-terminated Hyperbranched Poly(aryl-ether-ketone-imide), ST-PAEKI A 25-mL three-neck round-bottomed flask with a nitrogen-adaptor containing 4 (0.71 g, 1.0 mmol), diphenyl sulfone (DPS; 2.0 g), and CsF catalyst (10 mg) was quickly immersed in a silicon oil bath was preheated to 240° C. for 10 min under nitrogen. The mixture was stirred until bubbling ceased and the reaction was removed from heat and cooled. Before solidification, the reaction mixture was taken up into hot toluene followed by acetone, which were then removed in vacuo yielding a white powder. This powder was slurred in hot ethanol and the insoluble polymer was separated from the dissolved DPS by filtration and isolated as an amorphous powder to yield 5 in 90% yield. Anal. Calcd. for $C_{34}H_{29}NO_6Si$: C, 70.93%; H, 5.09%; N, 2.43%; Si, 4.88%. Found: C, 69.31%; H, 4.75%; N, 2.30%; Si, 4.38%. FT-IR (KBr, $cm^{-1}$): 3069, 2928, 2856, 1780, 1725, 1660, 1594, 1506, 1477, 1440, 1369, 1238, 1163, 1093, 1005, 906, 848, 762, 711. $^1H$ NMR (DMSO-$d_6$, ppm) δ −0.0411 (s, 12H, SiCH$_3$), 0.88 (s, 18H, CH$_3$), 6.89-8.02 (m, 137H, Ar—H). $^{13}C$ NMR (DMSO-$d_6$, ppm) δ −3.30, 17.69, 18.46, 25.71, 113.50, 115.42, 118.87, 124.60, 125.98, 126.64, 127.24, 130.28, 130.93, 132.65, 134.26, 134.88, 137.42, 138.42, 138.57, 141.01, 159.23, 160.88, 162.93, 165.82, 192.11, 192.29, 192.62, 193.34.

EXAMPLE 10

General Procedure for the Preparation of Nanoclay/PAEKI Composites Via Directly Blending Closites 10A, 15A and 20A (1-20 wt %) were dispersed in THF or DMAc by sonication. [The Closite nanoclay materials are commercially available from Southern Clay Products, Inc., 1212 Church Street Gonzales, Texas 78629.] Then PAEKI polymers, HT-PAEKI (4), PT-PAEKI (5), and ST-PAEKI (6) were added. The homogeneous suspensions were agitated using a Lab-line Multi Mixer for 12 h. The mixtures were sonicated again and then dried under vacuum at 100° C. for THF suspension, and 150° C. for DMAc suspension for 24 h. As an example, 0.02 g Closite 10A and 0.98 g. of HT-PAEKI together with 10 mL of THF or DMAc was used in the preparation of nanocomposite sample labeled as Sample No. 10) in the Table presented as Example 12. The binary compositions of Closite and HT-PAEKI (4), PT-PAEKI (5), or ST-PAEKI (6); and the preparative conditions are listed in Table (Sample No 7-29) in example 12.

EXAMPLE 11

General Procedure for the Preparation of Nanoclay/ST-PAEKI Composites Via In-Situ Polymerization Cloisites 10A, 15A and 20A (5 wt %) were first dispersed in THF by sonication. Then N-[3,5-bis(4-t-butyldimethylsilylbenzoyl)benzene]-4-fluorophthalimide (AB$_2$ monomer, Example 6) and a catalytic amount of CsF (10 mg.) were added. The homogeneous suspensions were agitated using a Lab-line Multi Mixer for 12 h. The mixtures were sonicated again, and then dried under vacuum at 50° C. for 24 h. The AB$_2$ Monomer in the resulting solids was polymerized at 240° C. for 10 min.

As an example, 0.05 g Closite 10A and 1.17 g. of AB$_2$ monomer together with 10 mL of THF were used in the preparation of nanocomposite sample labeled as Sample No. 52) in the Table presented as Example 12. The binary compositions of Closite and ST-PAEKI (6); and the preparative conditions are listed in Table (Sample No 39-54) in example 12.

EXAMPLE 12

Table summarizing the preparative conditions of PAEKI/Cloisite nanocomposites and their d-spacing ($d_{001}$) values:

| Sample No. | PAEKI | Clay | Clay Content (wt %) | Solvent | Method | $d_{001}$ (Å) |
|---|---|---|---|---|---|---|
| 7 | — | 10A | 100 | — | — | 20.1 |
| 8 | — | 15A | 100 | — | — | 33.5 |
| 9 | — | 20A | 100 | — | — | 24.2 |
| 10 | HT- | 10A | 2 | THF | D.B.$^a$ | 30.1 |
| 11 | HT- | 10A | 5 | THF | D.B.$^a$ | 29.9 |
| 12 | HT- | 10A | 10 | THF | D.B.$^a$ | 30.0 |
| 13 | HT- | 15A | 2 | THF | D.B.$^a$ | 33.1 |
| 14 | HT- | 15A | 5 | THF | D.B.$^a$ | 33.1 |
| 15 | HT- | 15A | 10 | THF | D.B.$^a$ | 31.5 |
| 16 | HT- | 20A | 2 | THF | D.B.$^a$ | 31.6 |
| 17 | HT- | 20A | 5 | THF | D.B.$^a$ | 30.6 |
| 18 | HT- | 20A | 10 | THF | D.B.$^a$ | 32.2 |
| 19 | PT- | 10A | 1 | THF | D.B.$^a$ | x$^d$ |
| 20 | PT- | 10A | 2 | THF | D.B.$^a$ | x |
| 21 | PT- | 10A | 5 | THF | D.B.$^a$ | x |
| 22 | PT- | 10A | 10 | THF | D.B.$^a$ | 30.5 |
| 23 | PT- | 10A | 20 | THF | D.B.$^a$ | 31.0 |
| 24 | PT- | 10A | 1 | DMAc | D.B.$^a$ | x |
| 25 | PT- | 10A | 2 | DMAc | D.B.$^a$ | x |
| 26 | PT- | 10A | 5 | DMAc | D.B.$^a$ | x |
| 27 | PT- | 10A | 10 | DMAc | D.B.$^a$ | 17.8, 36.5 |
| 28 | PT- | 10A | 20 | DMAc | D.B.$^a$ | 17.3, 35.4 |
| 29 | PT- | 15A | 1 | THF | D.B.$^a$ | x |
| 30 | PT- | 15A | 2 | THF | D.B.$^a$ | 33.4 |
| 31 | PT- | 15A | 5 | THF | D.B.$^a$ | 35.7 |
| 32 | PT- | 15A | 10 | THF | D.B.$^a$ | 33.5 |
| 33 | PT- | 15A | 20 | THF | D.B.$^a$ | 33.9 |
| 34 | PT- | 20A | 1 | THF | D.B.$^a$ | x |
| 35 | PT- | 20A | 2 | THF | D.B.$^a$ | x |
| 36 | PT- | 20A | 5 | THF | D.B.$^a$ | 35.7 |
| 37 | PT- | 20A | 10 | THF | D.B.$^a$ | 36.9 |
| 38 | PT- | 20A | 20 | THF | D.B.$^a$ | 33.2 |
| 39 | ST- | 10A | 1 | DMAc | D.B.$^a$ | x |
| 40 | ST- | 10A | 2 | DMAc | D.B.$^a$ | x |
| 41 | ST- | 10A | 5 | DMAc | D.B.$^a$ | x |
| 42 | ST- | 10A | 10 | DMAc | D.B.$^a$ | x |
| 43 | ST- | 15A | 1 | DMAc | D.B.$^a$ | x |
| 44 | ST- | 15A | 2 | DMAc | D.B.$^a$ | x |
| 45 | ST- | 15A | 5 | DMAc | D.B.$^a$ | x |
| 46 | ST- | 15A | 10 | DMAc | D.B.$^a$ | x |
| 47 | ST- | 20A | 1 | DMAc | D.B.$^a$ | x |
| 48 | ST- | 20A | 2 | DMAc | D.B.$^a$ | x |
| 49 | ST- | 20A | 5 | DMAc | D.B.$^a$ | x |
| 50 | ST- | 20A | 10 | DMAc | D.B.$^a$ | x |
| 51 | ST- | 20A | 20 | DMAc | D.B.$^a$ | x |
| 52 | ST- | 10A | 5 | THF | I.S.P.$^b$ | 31.2 |
| 53 | ST- | 15A | 5 | THF | I.S.P.$^b$ | 31.5 |
| 54 | ST- | 20A | 5 | THF | I.S.P.$^b$ | 34.3 |
| 55 | — | 10A | 100 | THF | NA$^c$ | 19.7, 38.1 |
| 56 | — | 10A | 100 | DMAc | NA$^c$ | 19.2 |

Having thus described exemplary embodiments of the present invention, it should be noted by those skilled in the art that the disclosures herein are exemplary only and that alternatives, adaptations and modifications may be made within the scope of the present invention.

What we claim:

1. A nanocomposite derived from direct blending of a hyperbranched polymer with the following formula:

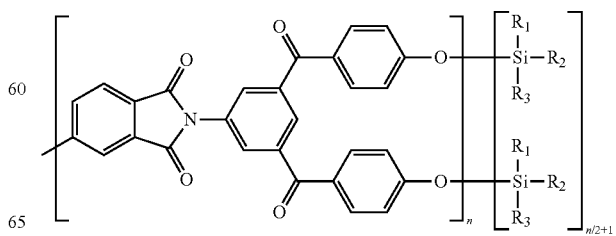

where $R_1$, $R_2$ and $R_3$ are substituents which may or may not be the same: wherein $R_1=R_2=R_3$=methyl; or $R_1=R_2$=methyl and $R_3$=is ethyl, n-propyl, iso-propyl, n-butyl, iso-butyl, sec-butyl, t-butyl, or neopentyl, and wherein n is the degree of polymerization; with a nanoclay in a suitable solvent.

2. The nanocomposites of claim 1 wherein the suitable solvent is tetrahydrofuran or N,N-dimethylamide.

3. The nanocomposites of claim 1 wherein the nanoclay is montmorillonite clay modified with the quaternary ammonium salt

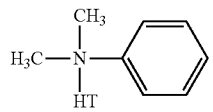

where HT represented hydrogenated tallow.

4. Nanocomposites derived from in situ blending of the hyperbranched polymer of claim 1 using the following 2-step process:
   (i) mechanically blending of a self-polymerizable $AB_2$ monomer of the formula:

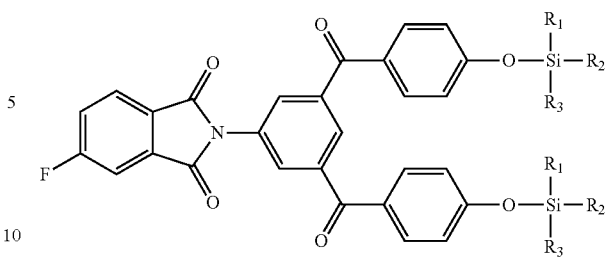

wherein $R_1=R_2=R_3$=methyl, with a nanoclay together with a catalytic amount of a metal fluoride in tetrahydrofuran; and
   (ii) thermal polymerization of the $AB_2$ monomer homogenously dispersed in nanoclay at a temperature of about 240° C.

5. The nanocomposites of claim 4 wherein the metal fluoride is cesium fluoride.

6. The nanocomposites of claim 5 wherein the nanoclay is Closite 10A.

\* \* \* \* \*